Nov. 13, 1956 F. C. GROVE 2,770,424
AUTOMATIC STATOR WINDING MACHINE
Filed April 6, 1953 9 Sheets-Sheet 1

INVENTOR.
Frank Carlton Grove
BY Alfred G. Gross
ATTORNEY.

Nov. 13, 1956  F. C. GROVE  2,770,424
AUTOMATIC STATOR WINDING MACHINE
Filed April 6, 1953  9 Sheets-Sheet 2

INVENTOR.
Frank Carlton Grove
By Alfred G. Gross
ATTORNEY.

Nov. 13, 1956  F. C. GROVE  2,770,424
AUTOMATIC STATOR WINDING MACHINE
Filed April 6, 1953  9 Sheets-Sheet 3

INVENTOR.
Frank Carlton Grove
BY Alfred G. Groov
ATTORNEY.

Nov. 13, 1956   F. C. GROVE   2,770,424
AUTOMATIC STATOR WINDING MACHINE
Filed April 6, 1953   9 Sheets-Sheet 4

INVENTOR.
Frank Carlton Grove
BY Alfred G. Gross
ATTORNEY.

Nov. 13, 1956  F. C. GROVE  2,770,424
AUTOMATIC STATOR WINDING MACHINE
Filed April 6, 1953  9 Sheets-Sheet 5

INVENTOR.
Frank Carlton Grove
BY Alfred G. Gross
ATTORNEY.

Nov. 13, 1956  F. C. GROVE  2,770,424
AUTOMATIC STATOR WINDING MACHINE
Filed April 6, 1953  9 Sheets-Sheet 6

INVENTOR.
Frank Carlton Grove
BY Alfred G. Gross
ATTORNEY.

INVENTOR.
Frank Carlton Grove
BY Alfred G. Gross
ATTORNEY.

INVENTOR.
Frank Carlton Grove
ATTORNEY.

Nov. 13, 1956     F. C. GROVE     2,770,424
AUTOMATIC STATOR WINDING MACHINE
Filed April 6, 1953     9 Sheets-Sheet 9

INVENTOR.
Frank Carlton Grove
BY
ATTORNEY.

United States Patent Office 2,770,424
Patented Nov. 13, 1956

2,770,424

AUTOMATIC STATOR WINDING MACHINE

Frank Carlton Grove, North Plainfield, N. J., assignor to The Hoover Company, North Canton, Ohio, a corporation of Ohio Application April 6, 1953, Serial No. 346,904

13 Claims. (Cl. 242—1)

My present invention relates to apparatuses for winding coils on the stators of electric motors and in particular upon stators of induction motors. My invention is an improvement over the stator winding machine disclosed and claimed in the copending application of Alfred Henry Wickham, Serial No. 172,433, and now abandoned, filed July 7, 1950, entitled Electro-Magnetic Core Winder.

It is a particular object of my invention to improve the stator winding machine disclosed in the aforesaid Wickham application, to increase the speed with which the same is enabled to wind a stator core, to eliminate numerous manual operations and, in particular, to eliminate the need for the operator to reset portions of the machine in the interval between successive pole windings, and it is also a particular object of my invention to improve the aforesaid Wickham machine by modifying the same to eliminate certain strenuous manual operations so that the apparatus may be operated by a female operator without imposing undue physical strain upon such an operator.

It is a particular object of my invention to improve the aforesaid stator winding machine by providing an automatically actuated mechanism for raising the upper forming head and a wound stator at the termination of a winding operation above the wire laying needle guide structure and to partially eject the stator from the winding pins to an extent such that a slight tug will release the completed stator completely therefrom. It is a further object of my invention to improve the aforesaid Wickham machine by providing means to vary the speed of the drive motor in such manner that coils of varying slot span may be wound at the maximum speed consistent with the length of arc through which the stator must oscillate between the action of laying successive slot conductors.

Other objects and advantages of the invention will become apparent as the description proceeds when taken in connection with the accompanying drawings, in which.

Figure 1A:
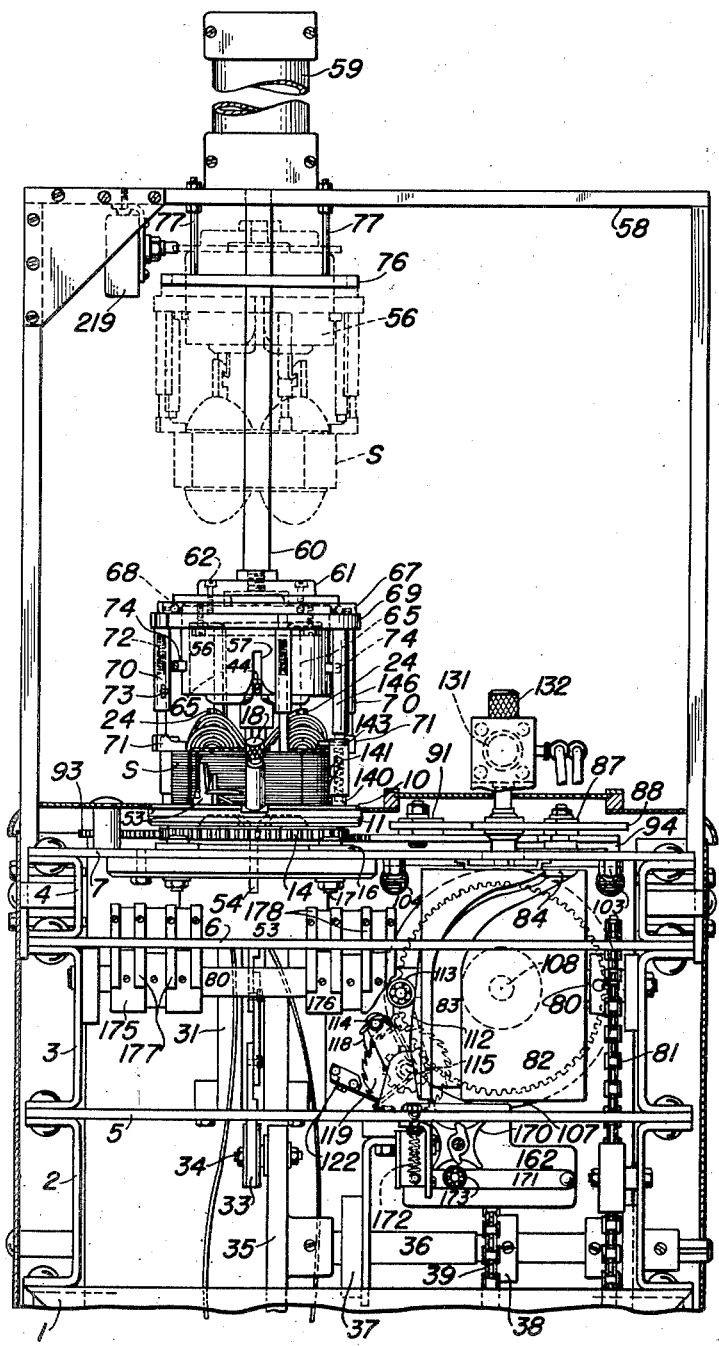
Figure 1A is an elevational view partly in section of the upper portion of an apparatus embodying my invention with the parts illustrated conditioned for winding a stator.

Referring now to the drawings and first to Figures 1A and 1B thereof, which are considered hereinafter as a single figure, my device comprises a rectangular base frame structure illustrated generally by the reference character 1 upon which is mounted a plurality of channel irons 2, 3 and 4 which support horizontal platforms 5 and 6 and a top working surface platform 7. These members briefly form the supporting frame of the machine which does not differ from the aforesaid Wickham application.

*Stator support mechanism*

Figure 4:
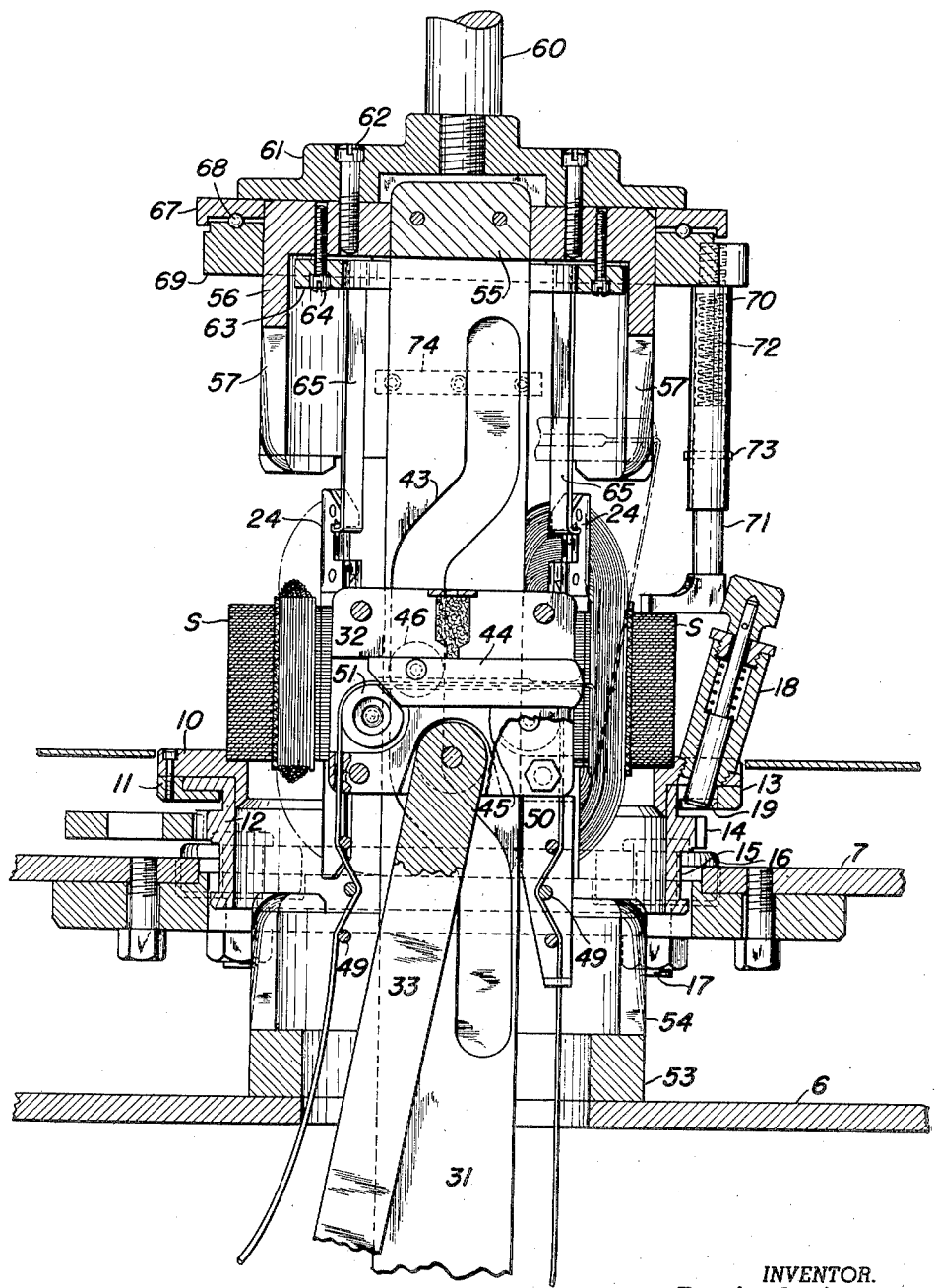
Figure 4 is a view taken along the line 4—4 of Figure 3 looking in the direction of the arrows.

As shown most clearly in Figures 1A and 4, a stator S to be wound seats upon an annular ring 10 rotatably supported by a drive ring 12 to which it is secured axially by means of a stud and clamping lugs 11. The drive ring 12 is provided with an outwardly projecting top flange 13 which is engaged by the clamping lugs 11 to hold the ring 10 against vertical movement. The drive ring 12 also is formed integrally on its exterior with a spur gear 14 which is positioned above a channel portion 15 providing a guideway which engages a plurality of circumferentially spaced support and guide rollers 16 pivotally supported on studs 17 carried by the upper working platform 7.

The support ring 10 also carries a manually actuated spring pressed plunger latch structure 18 adapted to engage in either of a pair of indexing holes 19 in the flange 13. The holes 19 are positioned 90° apart so as to index a stator mounted on the ring for winding poles of opposite polarity on a four-pole motor. If the device is utilized for winding motors having a differing number of poles, the drive ring flange 13 will have a greater or lesser number of indexing holes as may be required. In this specification, a four-pole stator will be assumed throughout.

Figure 2:
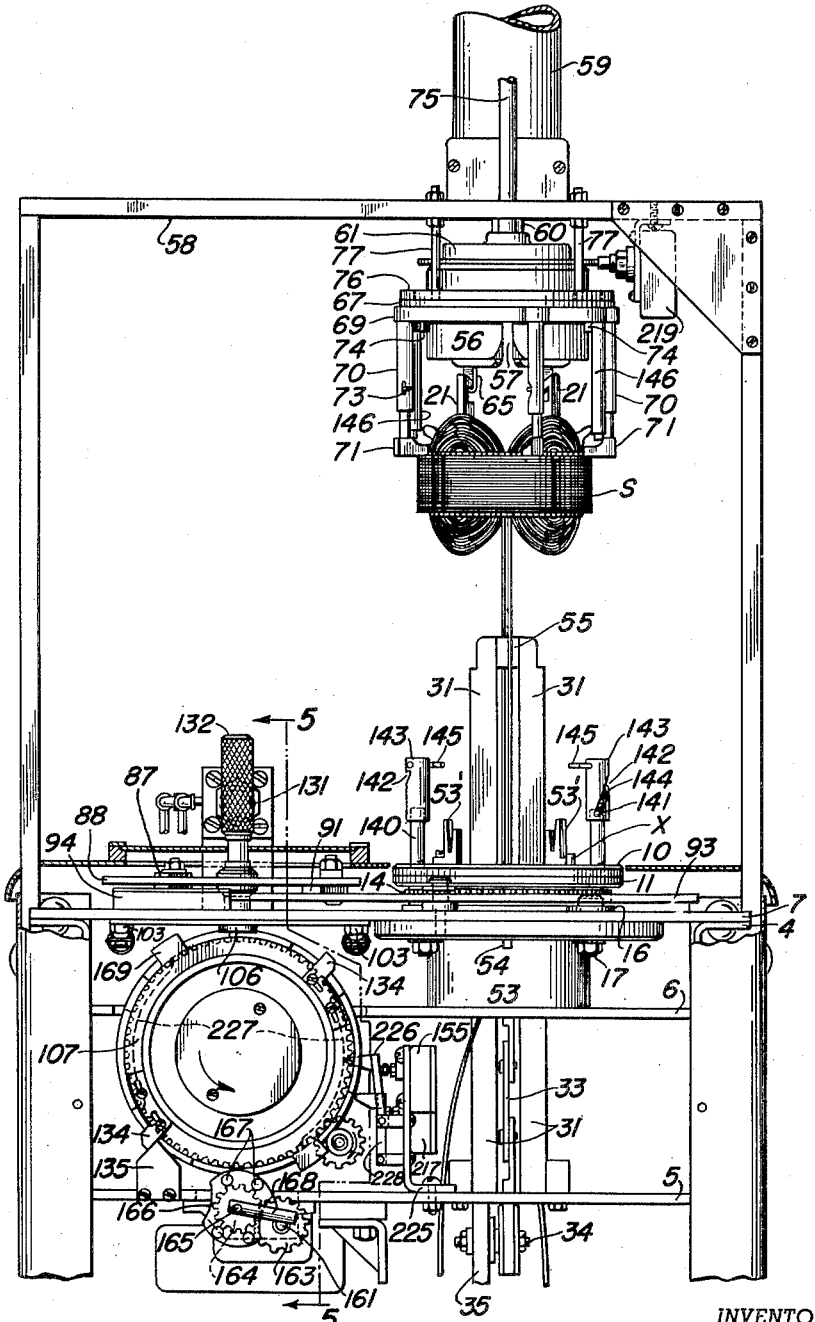
Figure 2 is a view of the apparatus of Figure 1A viewed from the opposite side of the machine.
Figure 3:
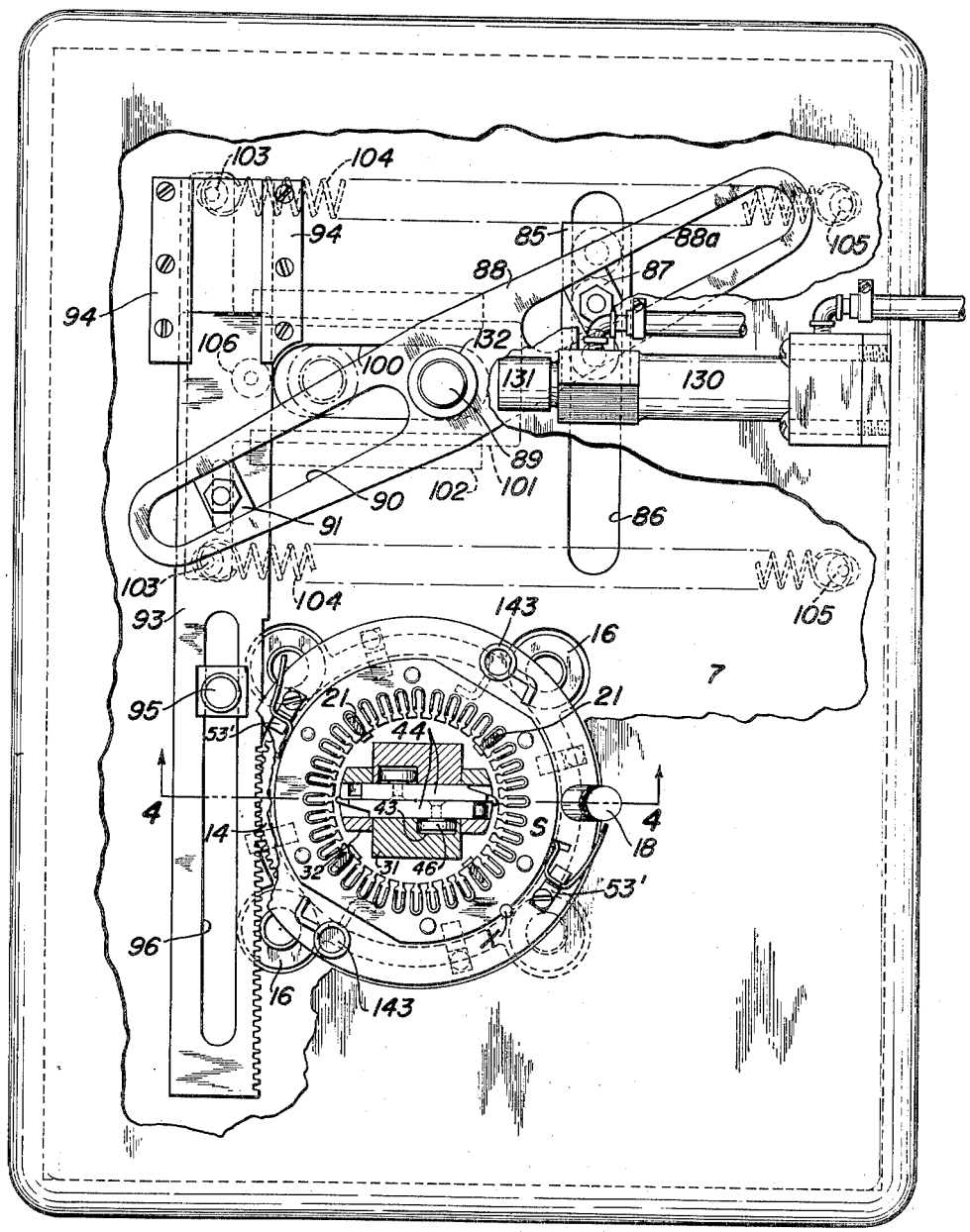
Figure 3 is a plan view of the working surface portion of the apparatus of Figure 2 with some parts broken away to illustrate underlying construction.

The stator core S is provided with an external indexing groove adapted to receive a pin X, see Figures 2 and 3, projecting upwardly from the support ring 10; that is, it is possible to apply the core to the ring 10 in only one position.

Figure 7:
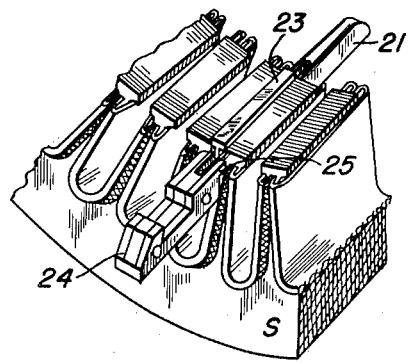
Figure 7 is a fragmentary perspective view illustrating the manner in which a forming pin is mounted in the stator.
Figure 8:
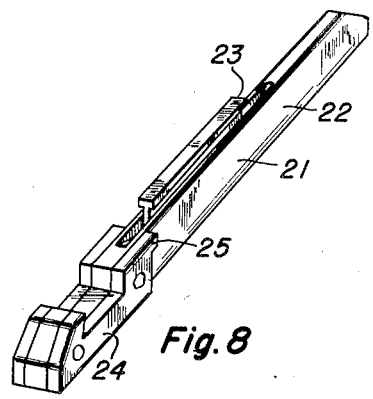
Figure 8 is a perspective view of a forming pin.
Figure 10:
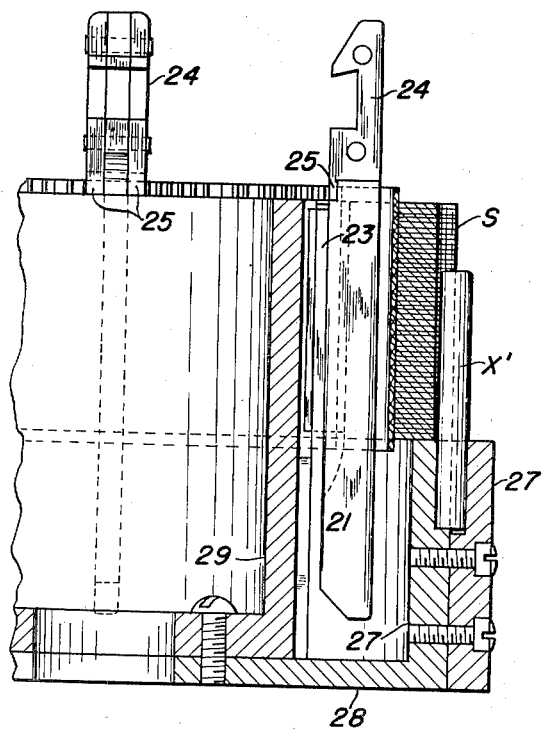
Figure 10 is a view illustrating the use of the fixture of Figure 9 with forming pins positioned on a stator to be wound.

As shown most clearly in Figure 3, the stator is provided with four removable winding pins 21 which are each positioned in the center of the windings forming an individual pole. Obviously, the position of these pins, with reference to the slot receiving the indexing pin X, is a fixed quantity. Referring now to Figures 7 and 8, each winding pin 21 comprises a narrow shank portion 22 adapted to be received within one of the slots of a stator S, as shown in Figure 7. Each shank 22 carries a T-section anchoring member 23 projecting therefrom. As is shown in Figure 7, the leg of the T-section 23 lies in the narrow mouth of the stator slot and the cross-arm of the T-section 23 engages the inner face of the stator to position the winding pin 21 radially with respect to the inner surface of the stator core. The shank 22 is provided with a wide, hook-shaped head section 24 which is cut away at its bottom edge to leave a downwardly projecting narrow foot 25 which, in the assembled relation of the pin with the core, rests upon the end of the core radially inwardly of the core slot liner, as shown in Figures 7 and 10. When assembled with a core, each winding pin is stopped by a metal-to-metal contact and no portion thereof is in engagement with the ends of the slot liner which might cause damage to the same.

Figure 9:
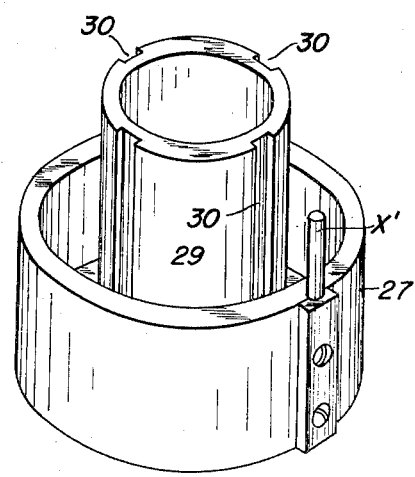
Figure 9 is a perspective view of a fixture utilized to position the forming pin in proper relation to the stator to be wound.

Figure 9 illustrates a fixture utilized for inserting and locating the pins 21. The locating fixture comprises an outer sleeve member 27 carrying a pin X' which corresponds to the pin X on the stator support ring and is designed to enter the slot in the stator core as shown in Figure 10 to index the stator core on the upper edge of the ring 27. The ring 27 is provided with a bottom portion 28 to which is bolted an inner ring 29 having a greater axial length sufficient to extend through the central portion of a stator resting on the ring 27. The inner sleeve 29 is provided with four slots 30 positioned in the relation to the pin X' which it is desired to have the winding pins assume with reference to the slot receiving the pin X'. A stator core is placed upon the fixture, as shown in Figure 10, and four pins 21 are then pushed downwardly into the slots of the stator which are aligned with the grooves 30 in the sleeves 29. It is impossible to insert the pins in any other position because only at the slots aligned with the grooves 30 is there sufficient clearance between the sleeve 29 and inner surface of the core to receive the cross-bar portions of the T-shaped member 23. After the pins 21 are inserted in a core to be wound, the core and pins are removed and then placed upon the support ring 10 with the pin X engaging the groove in the core S which assures that all portions of the apparatus are properly indexed relative to each other.

*Wire laying mechanism*

The wire laying mechanism herein disclosed is identical with that disclosed and claimed in the aforesaid Wickham application. Briefly, the wire laying mechanism comprises a pair of closely spaced guide pillars 31 which are bolted to the lower platform 5 and extend through suitable openings in the platforms 6 and 7 to a position well above the top of a core supported upon the ring 10. A needle support head 32 is mounted to extend between the spaced guide pillars 31 and to reciprocate thereon. The support head 32 is pivotally connected to an adjustable crank arm 33 which extends downwardly between the pillars 31 to a crank pin 34 projecting from a disc 35 and offset from the axis of the disc 35. The disc 35 is carried by a drive shaft 36 which is rotatably supported in bearings 37 supported by the plate 5 and channel frame member 2. The shaft 36 is driven by a sprocket 38 through a drive chain 39 which is driven by a sprocket 40 on a speed reducing gear box 41. The gear box is driven by a variable speed motor 42 through a magnetic brake 41a of a type which electrically releases the brake when energized. The motor rotates the disc 35 to drive the connecting rod 33 which imparts a vertical reciprocating motion to the needle head 32 along the guide pillars 31.

Each of the pillars 31 is provided with cam drive slots 43 which, as shown most clearly in Figure 4, have their end portions adjacent one edge of the pillar and their central portions adjacent the opposite side of the pillar. The needle head carries a pair of wire laying needles 44 slidably mounted in guide slots 45 in the needle head 32 and each carrying a roller 46 riding in one of the slots 43. Thus, as the needle carrying head 32 is reciprocated vertically, the needles 44 are drawn into the head, as shown in Figure 4, as they traverse the stator core, and are then projected radially outwardly of the core, as shown in dotted lines of Figure 4, when the needle head reaches the end portion of the reciprocating stroke. The needles 44 face in opposite directions and project in opposite directions from the needle guide head 32 at opposite ends of its stroke. Therefore, the apparatus simultaneously winds two identical coils 180° apart.

Figure 1B:
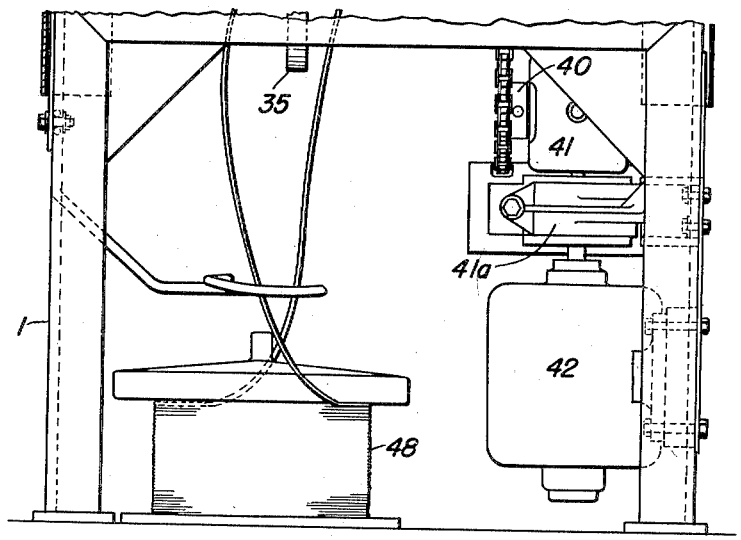
Figure 1B is the lower supporting and drive mechanism mounting portion of the apparatus shown in Figure 1A.
Figures 13, 14:
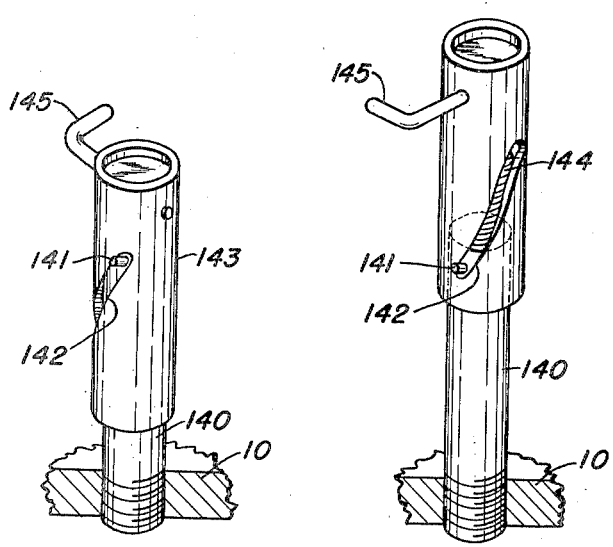
Figure 13 illustrates a hook device which automatically sets to catch a cross-over connection between adjacent poles.
Figure 14 is a view of the device of Figure 13 in its relaxed non-engaging position.

Wire is fed to the needles 44 from supply reels 48, see Figure 1B, resting upon the floor under the body of the machine and within the frame 1. The wire feeds upwardly through openings in the supporting platforms 5 and 6 over tensioning pins 49 carried by brackets 50 depending from the reciprocating head 32. The wire then passes through suitable guideways in the head 32 and over pulleys 51 mounted in the head 32 and then through the needles 44. In starting each coil, the needles are at the lower ends of their travel and the operator draws the wires through the needles and anchors each wire in a wedge-shaped slot in wire anchoring members 53' mounted on opposite sides of the core support ring 10. As the needle carrying head 32 is reciprocated, the needles will pass upward laying wire in a pair of diametrically opposed stator slots and the needles are then projected radially outwardly of the stator when clear of the top or bottom thereof as indicated by the dotted line showing of Figure 4. While the apparatus is in this condition, the stator is rotated by means to be described hereinafter through an arc equal to the slot span of the particular coils being applied. After the rotation of the stator ring is completed, the head 32 reverses the reciprocating movement and a wire is then laid in a new slot.

As shown in Figure 4, a forming drum underlies the drive ring 12 resting upon the platform 6 and surrounds the pillars 31. The drum 53 is provided with a pair of diametrically opposed slots 54 which receive the needles 44 in their projected position when the drum 32 is at the lower end of the stroke. The needles are in this condition at the time the stator ring is oscillating and the oscillation of the ring draws wire through the needle and wraps the same around the outer face of the forming drum to give the same an arcuate configuration. As the needle is subsequently reciprocated through a new slot, the arcuate end span thus formed on the outer surface of the drum 56 is drawn therefrom against the end portion of the stator core outside the winding pins 21 so that the end spans of the coils conform to the curvature of the core.

The upper ends of the pillars 31 are joined by a center block 55 and the top portions of the joined pillars 31 are squared off as indicated in Figure 2. The squared off portion of the top portions of the pillars 31 forms a seat which receives an upper forming drum 56 to hold the same against rotational movement. The upper drum 56 is provided with slots 57 corresponding to slots 54 in the lower drum and the upper drum performs the same function as the lower drum in forming and curving the end spans of the windings at the upper end of the core being wound.

*Stator clamping and lifting mechanism*

Referring now to Figure 1A, a bridge structure 58 is mounted on the machine frame overlying the wire laying mechanism. A hydraulic cylinder 59 is supported on the top portion of the bridge 58 and is centered with respect to the axis of oscillation of the core support ring 10. The hydraulic cylinder houses a piston which drives a piston rod 60, the lower end of which is threaded into a cap plate 61 which is secured to the upper winding or forming drum 56 by stud bolts 62, see Figure 4. A ring 63 is located internally of the winding head 56 and is secured thereto by bolts 64. The ring 63 carries projecting spring hook fingers 65 which are adapted to engage the hook ends 24 of the winding pins 21 under circumstances to be described hereinafter. When the parts are in the winding position illustrated in Figure 4, the lower hooked ends of the members 65 underlie the hooked ends of the pins 24 but do not engage the same so that the pins may oscillate with the stator during the winding operation without interference.

As shown in Figure 4, the cap plate 61 has a greater radius than the forming drum 56 so as to form a projecting radial flange at the upper end of the drum. A ball race ring 67 is slidably mounted on the outer surface of the drum 56 and is engaged by bearing balls 68 which also bear upon a lower ball race ring 69 slidably mounted on the exterior surface of the drum 56. The ring 69 supports a plurality of downwardly projecting tubular members 70 each slidably supporting a presser foot 71 positioned to engage the upper surface of a core S being wound but radially outwardly of the portion of the core to which windings are applied. The presser feet 71 are resiliently biased away from the ring 69 by compression springs 72 housed within the members 70. Pins 73 are attached to the portion of the presser foot slidably mounted in the tubular members 70 and project through slots in the members 70 to limit movement of the presser feet relative to the members 70.

The stop members 74, see Figures 1 and 4, are bolted to the exterior surface of the drum 57 in spaced relation to the cap plates 61 so as to be engaged by the ring 69 and thus limit sliding movement of the bearing structure 67, 68 and 69 on the drum 56.

The upper connected end of the guide pillars 31 is rectangular in section and is adapted to extend into a complementary shaped opening in the top portion of the drum 56 in order to prevent rotation of that drum when the parts of the apparatus are positioned as shown in Figure 4. As shown in Figure 2, a rod 75 is attached to the upper portion of the cap plate 61 and is slidable through the bridge member 58. The rod 75 is provided in order to maintain the upper forming drum 56 aligned with the upper end of the pillars 31 so that these two elements will engage smoothly to assume the position illustrated in Figure 4. It is the function of the presser feet 71 to maintain the core being wound in firm engagement upon the supporting ring 10. After a stator to be wound has been positioned on the ring 10, the hydraulic cylinder 59 is energized to drive the rod downwardly. This lowers the winding drum 56 and its appurtenant parts until the presser feet 71 engage the upper end of the stator and press the same firmly upon the ring 10. The stroke of the cylinder is such that the stator will be firmly pressed on the ring 10 with the presser feet retracted into the tubular members 70 against the springs 72, as illustrated in Figure 4. The reaction thrust of the springs 72 under these conditions is transmitted through the ring 69, balls 68 and ring 67 to the overhanging portion of the cap plate 61 and thus to the hydraulic cylinder mechanism. As the support ring 10 is oscillated during the winding operation, the presser feet and ring 69 oscillate therewith with the ring 67 and balls 68 forming an upper guide and thrust bearing for this purpose.

When a winding operation is completed, the apparatus is automatically stopped by a control mechanism to be described hereinafter with the wire laying needles in their low position. The cylinder 59 is then actuated by the control mechanism to raise the piston rod 60 and its supported parts. When the apparatus stops, the spring hooks 65 are aligned with the winding hooks 24 as illustrated in Figure 4; consequently, the stator core is lifted away from the ring 10 and above the needle guide mechanism, as illustrated in Figure 2, by the engagement between the members 65 and 24. During the lifting operation, the presser feet remain sustantially in the relationship to the stator and forming drum 56 illustrated in Figure 4 because the springs 72 are not strong enough to slide the stator assembly along the pins 21 against the friction of the wire wound behind the pins.

As the cylinder 59 nears the end of its lifting stroke, the upper bearing ring 67 is engaged by a fixed ring 76 supported from and below the bridge 58 by studs 77. The ring 76 has an internal diameter such that it will freely pass the cap plate 61 to engage the upper bearing ring 67. As the upper forming head 56 continues to rise under the influence of the cylinder 59, the ring 76 forces the bearing structure 67—69 and presser foot structure to slide relative to the head 56 and partially withdraw the winding pins 21 from their seats in the stator, this action continuing until the lower ring 69 engages the stop 74 at which time the parts are in the position illustrated in Figure 2. At this point, the completed stator may be removed by cutting the wires still connecting the same to the wire laying needles and then giving a sharp downward tug to the stator which will then be in position to completely release the pins 21 or by rotating the stator structure slightly to disengage the hook portions 24 of the pins 21 from the spring hooks 65, after which the winding pins may be completely removed from the stator at some other convenient place. During the lifting operation, the starting ends of the winding are withdrawn from the wire holders 53 as the stator rises.

*Oscillating mechanism*

The shaft 36 which is driven directly from the drive motor in turn drives a shaft 80 by means of a chain 81, see Figure 1A. The shaft 80 supports and drives a high speed control drum 82 provided in its surface with a cam track 83 which in turn drives a cam follower roller 84 carried by a block 85 slidably mounted in a slot 86 in the work table, see Figure 3. It is apparent from the foregoing that the rotation of the high speed drum 82 imparts a reciprocatory motion to the block 85. The block 85 pivotally supports a driving lug 87 which is slidably engaged in an elongated slot 88a formed in a rock arm 88.

Figure 5:
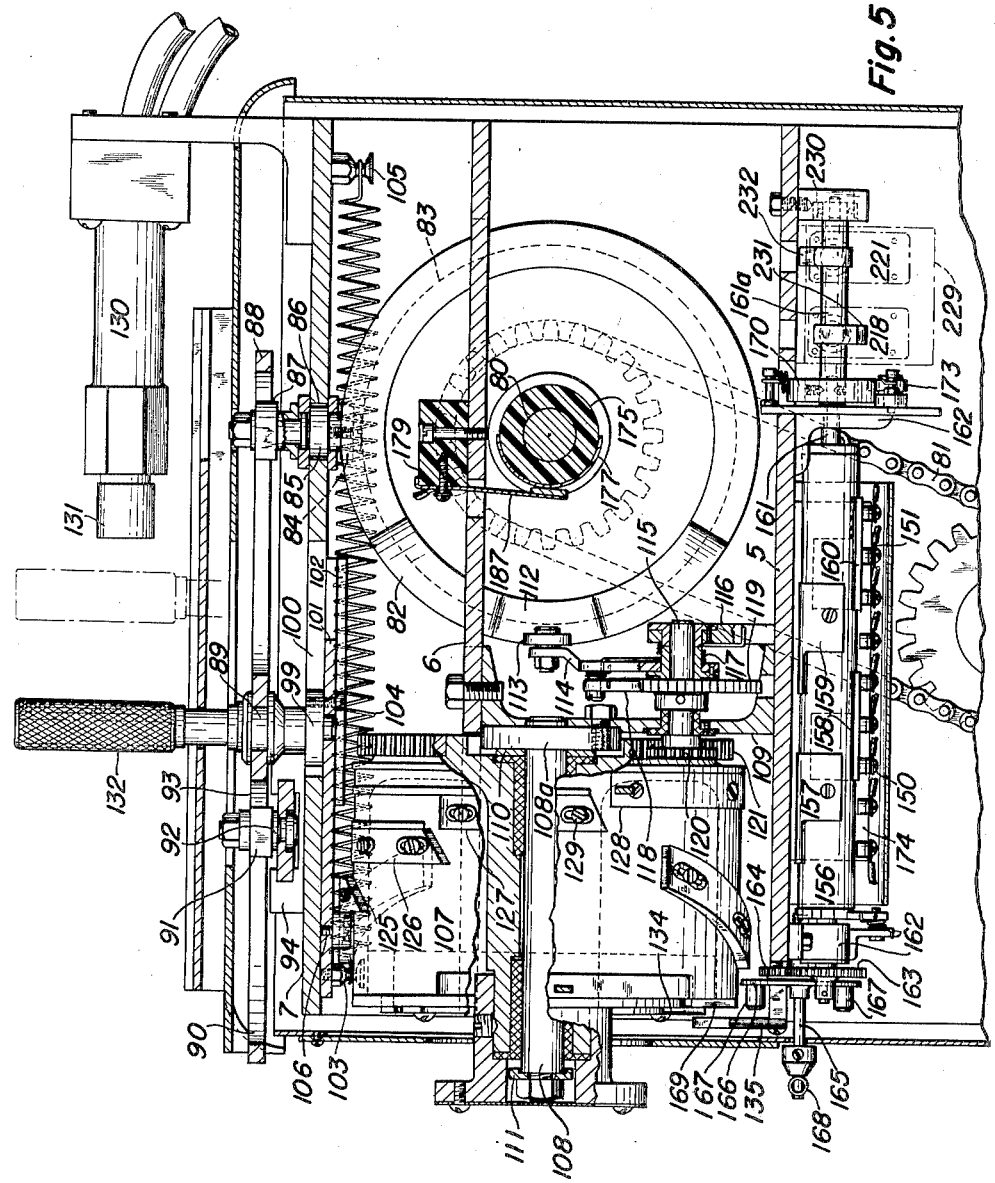
Figure 5 is a view taken along the line 5—5 of Figure 2 and looking in the direction of the arrows.

Referring particularly to Figures 3 and 5, the rock arm 88 is pivotally mounted upon a post 89 which is supported in a manner to be described hereinafter. The rock arm 88 is also provided with an elongated slot 90 which receives a sliding block 91 pivotally mounted on a stud 92 secured to a rack bar 93. The rack bar 93 is engaged with the spur gear teeth 14 on the drive ring 12. The rack bar is slidably supported on a guide member 94 secured to the platform 7 and engaging the end of the rack bar remote from the winding mechanism and by a guide pin 95 carried by the platform 7 and engaging in an elongated slot 96 formed in the rack bar.

It is apparent from the foregoing that the high speed cam 82 makes one complete revolution for each complete revolution of the needle drive mechanism and also imparts a complete oscillatory motion to the rock arm 88 which in turn imparts one complete reciprocation to the rack bar 93 which in turn imparts a complete oscillation to the stator support ring 10. Considering the wire laying needles as starting their upward stroke below the stator, the follower 84 will be in one of the dwell portions of the cam slot 83. The needles will rise through the core to their upper position laying wire in the aligned slots therein. During the period the needles are projected through slots 57 in the drum 56, the follower 84 will ride into a portion of the cam slot 83 having an axial component which will oscillate the stator sufficiently to align corresponding slots with the needles but on opposite sides of the adjacent winding pins and the needles will then descend, laying wire in the above mentioned slots while the cam follower 84 is in another dwell portion of the cam slot 83. After this second wire laying operation, the cam follower 84 again enters a portion of the cam slot 83 having an axial component and returns the apparatus to its starting condition while the needles are projected through slots 54 in the drum 53.

The pivot post 89 carries a block 99 slidably engaged in a slot 100 in the platform 7 and is bolted to a T-shaped slider 101. As shown most clearly in Figure 3, the pivot post 89 is mounted near the base of the post of the T-shaped member 101. The T-shaped member 101 is slidably supported along the underside of the platform 7 by guideways 102. The opposite ends of the arm portions of the T-shaped member 101 carry depending anchor studs 103 which are engaged by tension springs 104 having their opposite ends anchored to studs 105 depending from the platform 7 but on the opposite side of the machine frame from the studs 103. Viewed from the top, as in Figure 3, it is apparent that the springs 104 tend to slide the T-shaped member 101 to the right as far as they allow which brings the guide block 87 close to the pivot post 89 and removes the pivot post 89 from the driving block 91; that is, the springs tend to move the pivot post to a position imparting maximum reciprocatory movement to the rack 93 and hence imparting maximum angular oscillation to the stator support ring 10.

The T-shaped slider 101 is a cam follower and carries on its underside a roller 106 which is urged by the springs 104 against cam stops on a low speed drum member 107 now to be described.

The low speed cam drum is slidably and pivotally mounted upon a shaft 108 having a base flange 108a bolted to a bracket member 109 extending between and secured to the platforms 5 and 6. As viewed in Figure 5, movement of the drum 107 to the right under the bias of the springs 104 is limited by a thrust plate 110 mounted on the shaft 108 and engaging flange 108a. Movement of the drum 107 to the left is limited by a stop collar 111 bolted to the free end of the shaft 108.

Referring now to Figures 1A and 5, the high speed control drum 82 is provided at one end thereof with a cam surface 112 engaged by a roller 113 which is supported by a rocker arm 114 pivoted on a shaft 115 which is supported by bearing members in the frame member 109 and in an auxiliary frame bracket 116. A torsion spring 117 is wrapped about the shaft 115 and bears between the support member 116 and the arm 114 to maintain the roller 113 in engagement with the cam 112. The rock arm 114 also carries a spring pressed drive pawl 118 engageable with a toothed wheel 119 which is fixed to the shaft 115. Thus rotation of the low speed drum 82 periodically rocks the arm 114 and imparts periodical motion to the toothed wheel 119, which motion is transmitted to the low speed drum 107 by means of a gear 120 on the shaft 119 meshing with a gear 121 fixed to the end of the drum 107. Reverse rotation of the wheel 119 is barred by a spring stop 122 engaging the teeth of the wheel 119.

Figure 11:
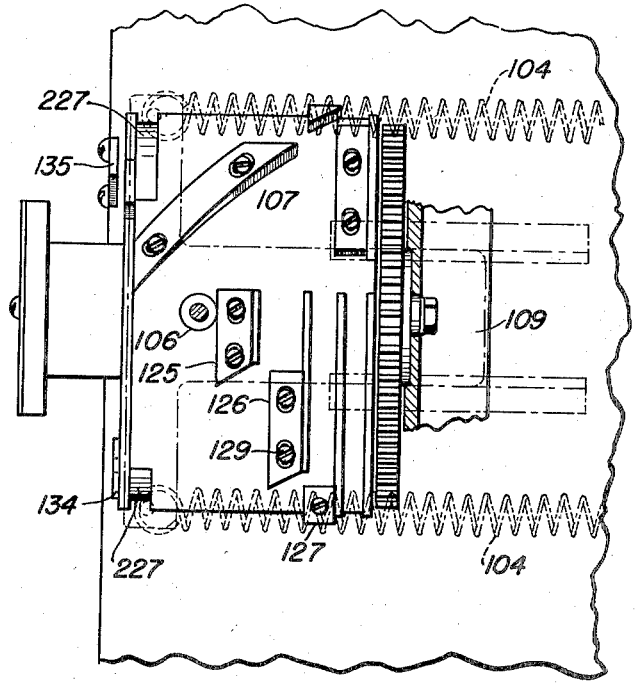
Figure 11 is an elevational view of a control drum.
Figure 12:
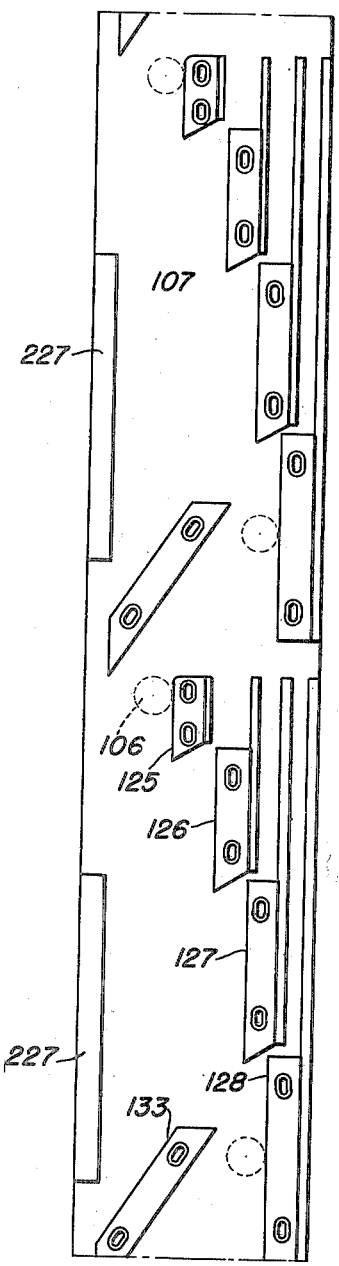
Figure 12 is a developed view of the control drum of Figure 11.

Referring now to Figures 5, 11 and 12, the low speed drum structure and operation will be described. The low speed drum has a plurality of stop plates 125, 126, 127 and 128 attached to the outer surface thereof. As shown most clearly in Figure 12, there are two identical sets of these stop plates and they progress from left to right as numbered. As viewed in Figure 5, the follower 106 is in engagement with a stop 125 and is held tightly thereagainst by the springs 104. This is the operating condition of the T slide 101 in which it is advanced a maximum distance to the left which imparts a minimum throw to the rocker arm 88 and hence a minimum oscillation to the stator support ring to wind coils of minimum slot span, a condition, for example, in which the opposite sides of a particular coil are laid in slots directly adjacent to and on opposite sides of a winding pin 21. As the machine continues to run, the ratchet mechanism driven by the high speed drum gradually indexes the drum 107 until the roller 106 rides off the stop 125 and into engagement with the succeeding stop 126, being shifted to this position by the springs 104. The number of turns in the windings laid while the roller 106 is in engagement with any one of the stops on the drum 107 is determined by the length of the stop. The shift from one stop to another occurs when the needles are either entirely above or entirely below the stator core being wound which is accomplished by positioning the cam 113 relative to cam slot 83 and crank pin 34 so that the drum 107 is never rotated unless the needles are clear of the core. The stops are provided with elongated slots receiving studs 129 engaging in drum 107 to provide for adjustment of the stops.

As the roller 106 progresses from the stop 125 to the stop 128, coils of progressively larger slot span are wound on the stator. After the follower 106 has engaged the stop 128 for a time sufficient to wind the desired number of coils in the slots having a span corresponding to the stop 128, which is the coil of maximum slot span in the first pair of pole windings, the winding operation is discontinued with the needles stopped above the core being wound by a control mechanism to be described. The control mechanism also energizes a hydraulic cylinder 130 mounted on and projecting above the platform 7 and having a piston rod 131 adapted to engage a handle 132 mounted on and projecting from the pillar 89. As shown in Figure 5, the handle 132 is closely adjacent the ram 131 while the follower 106 is in engagement with the stop 128. When the hydraulic cylinder 130 is actuated, the piston rod 131 projects therefrom engaging the handle 132 and drives the pivot post 89 and T slide 101 to the left, as viewed in Figure 5, against the bias of the springs 104 until the roller 106 engages a diagonal cam strip 133 on the drum 107. The pressure of the roller 106 against the diagonal cam plate 133 shifts the drum 107 to the left to the extent permitted by the stop collar 111 and then rotates the drum 107 through a predetermined angle until one of a pair of stop plates 134 attached to the front end of the drum 107 engages a fixed stop 135 which is carried by the platform 5. At this time, the drum 107 has been rotated sufficiently to align the follower 106 with the succeeding one of the stops 125. The rotation of the drum 106 also actuates a control mechanism in a manner to be described hereinafter to de-energize the cylinder 130 which retracts the piston rod 131 and the springs 104 immediately shift the T slide until the follower 106 is again in engagement with a stop 125 after which a second set of coils is wound upon the core. The control mechanism reverses the direction of rotation of the motor 42 to wind the second pair of poles reversely to the first pair of poles.

It is highly desirable to form a loop in the wire at the point where the same crosses from one pole to a succeeding pole wound by the same needle. This loop should be formed during the time the cylinder 130 is resetting the T slide 101 and its appurtenant parts at the completion of the first pair of pole windings on the stator and before the beginning of the operation of winding the succeeding pair of pole windings. The apparatus for accomplishing this function is illustrated in Figures 1A, 2, 4, 13 and 14 and comprises a pair of diametrically positioned studs 140 secured to the support ring 10 and having pins 141 secured to their upper ends and projecting into a helical slot 142 formed in sleeves 143 slidably mounted on the studs 140. The sleeves 143 are urged upwardly to the limit allowed by the slots 142 by compression springs 144 which are housed therein. The upper end of each sleeve carries a right angularly bent pin 145.

The bearing ring 69 carries a pair of depending studs 146 adapted to be aligned with the closed upper ends of the sleeves 143. When the cylinder 59 is actuated to clamp a stator on the support ring 10 by lowering the upper winding forming head and its appurtenant parts, the pins 146 engage the upper ends of the sleeves 143 depressing them against the springs 144 to the limit allowed by the slots 142. Due to the helical configuration of the slots 142, the sleeves 143 turn, swinging the loop catching hooks inwardly over the core being wound in the position of the parts shown in Figure 1A. The loop catching hooks 145 extend into the path which will be traversed by the wire leading from the wire laying needle to the coils already wound on the stator as the stator support ring is indexed by the indexing lock mechanism 18 to align the same with the needles for winding a second pair of coils, it being remembered that the machine always stops with the needles above the stator at this intermediate stage of the winding. The loops of wire caught by the hook 145 are retained thereby during the entire succeeding winding operation. At the termination of the winding operation, the upper forming head and its attached stator is raised from the support ring 10. As these parts raise from the position of Figure 1A, the pillars 146 raise from the sleeves 143, which then rise from the Figure 13 to the Figure 14 position, withdrawing the hook 145 from the loops previously caught thereby, and freeing these loops so that the stator can be raised without interference.

Control mechanism

Figure 6:
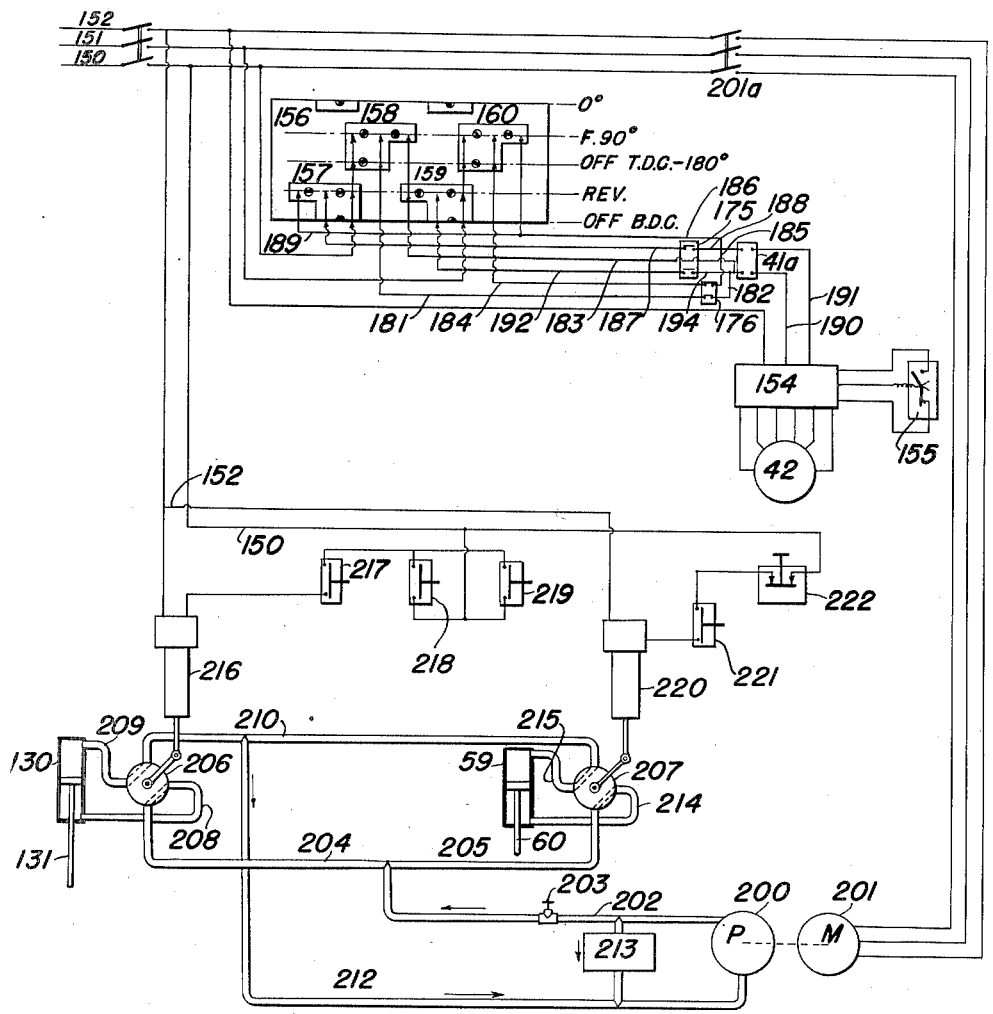
Figure 6 is a schematic drawing illustrating the electrical and hydraulic driving and controlling mechanism of the apparatus.

The electrically energized portions of the apparatus are supplied through supply conductors 150, 151 and 152 of a three-phase supply which is controlled by a line switch 153. The main drive motor 42 is a multi-speed reversible type and its energization is directly controlled by a speed controller 154 which is, in turn, controlled to energize the motor for high or low speed operation by a two-position cam switch 155, as indicated in Figure 6. The speed controller and its control switch are conventional and are not described in detail. The speed controller 154 connects directly to phase conductor 152; however, its connections to the phase conductors 150 and 151 are controlled by multiple switching arrangements now to be described.

The principal controlling element comprises a drum switch which consists of a drum 156 of insulating material, shown developed in Figure 6, upon which are mounted contact plates 157, 158, 159 and 160 each having a main portion and a projecting portion of lesser circumferential extent as shown. The various angular positions of the drum 156 and its contact plates are indicated in the developed view of Figure 6.

Referring now to Figure 5, the structural arrangement of the drum switching structure 156 is illustrated. The drum 156 is fixedly attached to a shaft 161 which is rotatably supported in bearing blocks 162 depending from the platform 5. Adjacent the front of the machine beyond the front bearing 162, the shaft 161 carries a spur gear 163, see Figure 2, which meshes with a second spur gear 164 attached to a shaft 165 pivotally mounted in the front bearing block 162. The shaft 165 also carries a plate 166 on which are mounted four pins 167 to be actuated in a manner to be described hereinafter. These pins are positioned at the four corners of the rectangle as illustrated in Figure 2. The outer end of the shaft 165 is provided with a manual actuating handle 168 which provides a means for manually setting the drum switch through the gearing 163 and 164.

The low speed control drum 107 is provided with a pair of diametrically positioned projections 169 adapted to engage one of the pins 167 when the plate 166 is positioned as illustrated in Figure 2 with the long axis of the rectangle vertical. The projection 169 and pins 167 are to the right of the projection 134, see Figure 5, so as not to interfere with these elements. When the pins 167 are turned 90° from the position of Figure 2, the pins 167 are out of the path of movement of the cam projections 169. The drum switch is actuated by the projections 169 to deenergize the apparatus in a manner to be described more fully hereinafter and the drum switch is manually actuated through the handle 168 to energize the apparatus in a manner also to be described more fully hereinafter.

To the right of the rear bearing block 162, the shaft 161 carries a star wheel 170, see Figures 1A and 5, the lower arms of which bear on a lever 171 pivoted on the rear bearing block 162. The lever 171 is urged into engagement with the star wheel by a tension spring 172. A roller 173 on the lever 171 is positioned to be engaged by the points of the star wheel as the same is rotated and forms a snap acting mechanism for rotating the shaft 161 to a new 90° position when slightly more than one half a 90° movement is imparted thereto by the projection 169 and pins 167. Such movement of the shaft 161 moves pins 167 through an arc of 90° to position the long axis of the rectangle horizontal in which position the pins clear projections 169. The operator manually actuates the drum switch to start initial winding of a core and again to start winding the second pair of poles, as will be explained, by rotating the handle 168. The spacing of the pins 167 is such that the projections 169 will clear the pins when they are positioned with the long axis of the rectangle horizontal. After each actuation of the drum switch by projections 169, the drum 107 is actuated by cylinder 130 to a new position before the pins 167 are again moved into the path of movement of pins 167.

A contact supporting plate of insulating material 174 is suitably attached to the underside of the platform 5 and carries a plurality of spring pressed contact buttons adapted to engage and disengage various portions of the contact plates as the drum 156 is rotated.

To facilitate explanation of the electrical circuit, the contact buttons in Figure 5 will be given the same reference characters as will be applied to the conductors to which they connect in Figure 6, it being noted, in this connection, that the various arrowheads applied to the conductors in Figure 6 illustrate the contact-making positions of the spring contacts at the specified angular positions of the drum 156.

Since the drum 156 is driven through the low speed drum 107, it is very difficult to insure actuation of this drum at the precise moment required to stop the machine with the needles in a predetermined position. Accordingly, an extra switching means is provided to assure this result and comprises drum switches mounted on the high speed shaft 80. Since the high speed shaft 80 rotates at the same speed as the needle drive shaft 36, switches controlled by the shaft 80 can be readily adjusted to stop the wire laying needles in any desired position. Referring to Figures 1A and 5, insulating drums 175 and 176 are mounted on the shaft 80. The drum 175 carries a pair of bridging contact plates 177 and drum 176 carries bridging contacts 178. It is apparent from the foregoing that each of the drums 175 and 176 is adapted to make and break two electrical circuits. The drum 175 functions as will be explained more fully hereinafter to stop the apparatus with the needles in their low position and the drum 176 similarly functions to stop the needles in their high position. The contact strips on the drums 175 and 176 are engaged, in proper angular position of the contact strips, by spring contact fingers which are supported on insulating blocks 179 and 180, respectively. The contact blocks 179 and 180 are mounted on the upper surface of the platform 6 and project through suitable openings formed therein to engage the contact strips on the drums. For convenience in illustration, the contract strips shown in Figure 1A will be given the same reference characters as the conductors to which they connect in Figure 6.

In the forward running position at the 90° mark on the drum 156, the line conductor 150 is connected to the contact strip 158 and thence through line contact 181, one bridging contact of the top drum switch 176, line 182, one side of magnetic brake 41a and conductor 190 to the speed controller 154. Another circuit is made from the narrow portion of contact plate 158 through contact conductor 183 to the same side of the brake 41a. Similarly, the phase conductor 151 is connected through the wide portion of contact plate 160, contact conductor 184, the other bridging contact of switch 176, conductor 185, the other side of the brake 41a and conductor 191 to the speed controller 154. Another circuit is made from the narrow part of plate 160 through conductor contact 186 to the brake 41a to conductor 191.

Thus, the line conductors 150 and 151 have two paths connected through two circuits to the motor as long as the narrow parts of the contact block are in circuit. Once the narrow portions of the blocks are removed from circuit, the motor is energized then only through the drum switch 176 and is de-energized as soon as that moves to open circuit position which occurs whenever the needles are in their high position.

When the drum switch 156 is actuated from the forward running 90° to the off 180° position, it is noted that the circuit through the line contactors 186 and 183 is broken. However, the phase conductors 150 and 151 are still connected to the conductors 190, 191 through the top needle stopping drum switch 176 and the magnetic brake. This condition continues until the switch 176 is next open-circuited which will occur with the needles in their top position and the machine is then de-energized for the operator to index the stator support ring 10 manually through an arc of 90° during the course of which the loop catching hooks 145 engage the wires running from the needles to the completed pole windings and form a loop therein which is held while the subsequent pair of pole windings are applied to the stator core. When the machine has been re-started, in a manner to be described hereinafter, the drum switch 156 is manually actuated to the 270° reverse position. In this position of the parts, the phase winding 150 is connected to the speed controller through the contact plate 157, contact conductor 187, one bridging contact of the low needle position stop switch 175, the conductor 188, one side of the magnetic switch 41a and conductor 191 to the speed controller 154. An additional circuit is made through the narrow portion of contact plate 157 through contact conductor 189, which is a continuation of conductor 186 and conductor 188 to the same side of the magnetic brake 41a.

The phase conductor 151 now connects through the wide portion of contact plate 159, conductor contact 192, the other side of the low needle stop switch 175, conductor 194 and the other side of the magnetic brake 41a and conductor 190 to the speed controller. In addition, a separate circuit is made from the narrow portion of contact plate 159 through the contact conductor 183 and the magnetic brake 41a to the conductor 190. It is noted that, in the 270° reverse position of the drum switch 156, the connections of the phase conductors 150 and 151, with respect to the speed controller, are reversed from their connections through the contact plates 158 and 160. Consequently, the motor 42 will run in a reverse direction for winding the second pair of poles with reverse polarity as pointed out hereinabove. When the drum switch is actuated from the 270° reverse position to the 360° off position, the circuit through the narrow portions of the contact plates 157 and 159 is broken and current is supplied to the speed controller from the phase conductors 150 and 151 solely through the two contacts of the drum switch 175 and, consequently the circuit of the motor is interrupted as soon as the needles are next in their lowest position at which time both bridging contacts of the drum switch 175 are open circuited and the winding operation is completed.

The hydraulically actuated cylinders 130 and 59 are supplied with actuating fluid by means of a pump 200 driven by an electrical motor 201 which is controlled by a switch 201a from the supply lines 150, 151 and 152.

Oil under pressure discharging from the pump 200 flows through a conduit 202, pressure regulating valve 203, branch conduits 204 and 205 to the supply sides of four-way reversing valves 206 and 207, respectively. In the position of the parts shown, the valve 206 is set to supply fluid under pressure from conduit 204 through conduit 208 to the forward portion or rod end of the cross rod actuating cylinder 130 to retract the rod 131. Oil in the opposite end of the cylinder is driven through conduit 209, valve 206, conduit 210 and conduit 212 back to the pump 200. The discharge and supply conduits 202 and 212 are cross-connected between the pump 200 and valve 203 by a reservoir and pressure relief mechanism indicated by the reference character 213. This mechanism is a conventional type of hydraulic apparatus and simply involves a spring loaded valve which allows fluid to discharge through the pipe 202 into the reservoir and then back to the inlet side of the pump when pressure in the pipe 202 increases to a predetermined value. The fluid supplied through the conduit 205 flows through the inlet side of the valve 207, with the parts in the position shown, through conduit 214 into the connecting rod end of cylinder 59 to retract the rod into the cylinder, that is, in a direction to raise the stator clamping mechanism, and drives oil from the other end of the cylinder through conduit 215, valve 207 and into conduit 210 for return to the reservoir 213 and pump 200.

The valve 206 is controlled by an electrically energized solenoid mechanism 216 which is biased to move the valve 206 to the illustrated position when the electric circuit of the solenoid is open. When the electric circuit of the solenoid is closed, the valve 206 is actuated to connect conduit 204 to conduit 209 and connect conduit 208 to conduit 210, thus reversing the hydraulic connection to the cylinder 130.

The electric circuit for the solenoid 216 is from the phase conductor 152, solenoid 216, normally open switch 217 and parallel connected normally open switches 218 and 219 to phase conductor 150.

The valve 207 is actuated by an electrically energized solenoid 220 of the type which is biased to move the valve 207 to a position the reverse of that shown when the solenoid is de-energized. When this de-energized condition obtains, the solenoid moves the valve 207 90° clockwise, as viewed in Figure 6, to connect conduit 205 to conduit 215 and to connect conduit 214 to conduit 210, thus reversing the hydraulic connection to the cylinder 59. The electric circuit for the solenoid 220 runs from phase conductor 152, solenoid 220, normally open cam switch 221 and normally closed manual push switch 222.

The hydraulic system, including drive motor, pump, piping and valving, has not been shown in the structural views as this part of the apparatus in and of itself is of a conventional construction, except insofar as the relationship of the two cylinders to the structural parts of the apparatus and the controls therefor is concerned which has been illustrated in full. The control switches are illustrated in the structural parts of the apparatus because it is at this point that the relationship between the hydraulic and mechanical systems is established.

The switch 155, which controls the speed controller to change the motor from high to low speed operation and vice versa, is mounted on a bracket 225 supported by platform 5, adjacent the low speed drum 107. The switch 155 is actuated by a pivotally mounted cam follower 226 which bears on the forward portion of the drum 107 in position to ride into depressed sections 227 in the drum 107, see Figures 11 and 12, when the switch is actuated to condition the motor for low speed operation.

The depressions 227 have sufficient width axially of the drum 107 to accommodate the axial shifting of the drum during resetting operation without damaging the follower 226. When the follower 226 rides on the periphery of the drum 107, the speed controller is in condition for high speed operation. It is apparent, from the developed view of Figure 12, that high speed operation of the motor obtains when the roller 106 is in engagement with the cam stops 125 or 126, that is, when the apparatus is winding coils of small slot span and that the motor operates at its low speed when the roller 106 engages the stops 127 or 128 when the apparatus is winding coils of large slot span. This arrangement has been followed because it is found possible to wind coils of small slots span at much higher speed than the maximum safe speed for coils of long slot span; hence, the multi-speed feature of the invention permits the apparatus to be operated at a speed approaching the maximum usable speed at all times.

The normally open switch 217 is also supported on the bracket 225 and is adapted to be actuated by a cam follower 228 pivotally mounted on the bracket 225 and engaging the low speed drum 107 in position to actuate the switch 217 to the closed circuit position when the cam follower rides onto either of the stop members 128 on the drum 107. Closure of the circuit through the switch 217 is a safety or conditioning measure and does not in and of itself cause actuation of the solenoid 216 to cause the cylinder 130 to advance the rod 131 for resetting the T slide 101. The normally open switch 218 is mounted on a bracket 229 depending below the platform 5 adjacent an extension 161a of shaft 161. The shaft 161a is attached to the star wheel 170 at its center and is also supported at its opposite end by a bearing 230 depending from platform 5. Shaft 161a carries a cam 231 adapted to engage the switch 218 and actuates the same to closed circuit position. The cam 231 is positioned on shaft 161a relative to the control contacts on drum switch 156 so as to close the switch 218 when the shaft 161 is actuated to move the drum to the 180° off position, as indicated in Figure 6. With switches 217 and 218 in closed circuit position, the solenoid 216 is energized to reverse the position of the four-way valve 206 illustrated in Figure 6 which advances the piston rod 131 to reset the T slide 101 against the second of the stops 125 which again conditions the apparatus for operation to wind coils of minimum slot span. At the end of the resetting operation, that is, when the roller 106 has followed the diagonal cam 133 to a point at which it is now axially aligned with one of the stops 125, the drum 107 has been indexed sufficiently to ride the stop 128 away from the cam follower 228 which open circuits the switch 217 causing the rod 131 to retract and restore the cross slide to the action of the spring 104.

The switch 219, which is normally in open circuit position, is supported by the bridge 58 in position to be engaged and actuated by the projecting flange portion of the cap plate 61 when the same is raised to the position shown in Figure 2 at the termination of a winding operation. Since switches 218 and 219 are shunt connected, a circuit is made to the solenoid 216 even though switch 218 is open circuited at this time, though switch 217 is now in closed circuit position as it again rides one of the stops 128. Energization of solenoid 216 through switch 219 functions in exactly the same way as energization thereof through switch 218 which resets the cross slide and then de-energizes the solenoid to retract the piston rod 131.

The switch 221 is supported by the bracket 229 in position to be actuated by a cam 232 on shaft 161a. The cam 232 is indexed on the shaft 161a relative to the drum switch 156 so as to move the switch 221 to closed circuit position when the drum switch is in the 0° off position which energizes the solenoid so as to move the valve 207 to the position shown in Figure 6 which causes piston rod 60 to rise and remove a completed winding from the winding support ring 10.

It will be seen, from the immediately foregoing remarks, that the circuits are established to maintain the piston rod 60 retracted, together with the winding top forming drum and other portions carried thereby as the machine exists when it is in condition for starting. After the wire has been engaged in the slot in anchor 53 and a stator with properly indexed winding pins placed on the stator core support ring 10, the operator first manually opens the normally closed switch 222 which de-energizes the solenoid 220, causes the same to move to the reverse position from that illustrated in Figure 6 which projects the rod 60 and clamps the stator on the support ring 10. As the rod 60 and its appurtenant parts lower, the operator manually rotates the ring 69 so as to align the pillar posts 174 with the loop catching hook support collars 143 to insure engagement of these parts. After the clamping apparatus is seated, the operator, while still holding the switch 222 open, engages the handle 168 and manually advances the control switch to the 90° forward run position illustrated in Figure 6. Such indexing of the shaft 161 disengages the cam 232 from switch 221 opening the control circuit to the solenoid at this point; hence, the manual switch can now be released without changing the position of the clamping apparatus.

After the initial starting operation above described, the machine first winds coils of minimum slot span with the roller 106 in engagement with stop 125. After this operation is completed, the drum 107 is rotated sufficiently so that the roller 106 shifts into engagement with stop 126 to wind a pair of succeeding coils of larger slot span. At the completion of this operation, the drum 107 again is indexed sufficiently to ride the roller 106 into the stop 127 but at this time, the switch 155 is actuated through the cam follower 226 engaging in the groove 227 to shift the motor to low speed operation which is the condition prevailing while the coils of wide slot span corresponding to the condition of the roller 106 against stops 127 and 128 maintain. At the conclusion of the winding of the first pair of poles, the drum switch 156 is actuated to de-energize the motor except for the shunt circuit through the top position holding switch which stops the machine when the needles are next in their elevated position. As soon as the machine stops, cam 221 closes the switch 218, switch 217 being already closed, and the cylinder 130 then resets the drum 107 to a new, high speed minimum slot span winding condition. The operator now manually indexes the stator support ring 10 for winding the final pair of poles and after this is completed, manually actuates the handle 168 to set the drum switch at the 270° reversing position of Figure 6. The machine now repeats the foregoing high speed, low speed winding operation, though winding in a reverse direction to obtain reverse polarity until the windings are completed whereupon the drum is actuated to the off position and the machine stops when the needles next reach their lowermost position below the stator as controlled by the switch 175. As explained above, the cam 232 now moves the switch to closed circuit position and the cylinder 59 raises the completed stator and winding head apparatus to the Figure 2 position and at the same time closing switch 219 as it reaches the end of its stroke which energizes the cylinder 130 to reset the low speed drum 107 for the succeeding winding operation.

In my improved apparatus, the operator does not have to remove the heavy upper winding head manually, to catch the inter-pole loop manually and release the same manually before removing a completed stator, does not have to reset the cross slide 101 and its appurtenant parts manually or reset the drum 107 manually. In addition, the winding pins are partially withdrawn from the stator by the machine so that the same may be easily removed after the stator is removed from the clamping mechanism or may be removed simultaneously with the removal of the completed winding from the stator clamping mechanism. In addition, the apparatus has a variable speed characteristic which enables windings of varying slot span to be laid at maximum speed consistent with the angular extent of the slot span.

My improved apparatus has eliminated all heavy manual operations to the degree such that the machine can be operated by a female operator without imposing an unreasonable muscular effort upon such an operator.

While the invention has been illustrated and described in detail herein, it is not to be limited thereto but various changes may be made in the construction, design and arrangement of parts without departing from the spirit of the invention or the scope of the appended claims.

I claim:

1. In an electromagnetic core winding machine a rotatably mounted core support, a wire laying needle, means for reciprocating said needle back and forth through a core on said support, means for oscillating said support when said needle is at opposite ends of its reciprocating movement, means for clamping a core having emplaced winding pins on said support, means mounting said clamping means for movement to and from clamping position, means on said support for indexing a core to a plurality of positions thereon for winding successive poles on a core, means for driving said needle and said oscillating means, control means for stopping said driving means at the termination of a pole winding with said needle adjacent one end of its stroke, means for catching a loop of wire from said needle as said core is indexed for winding a new pole, means biasing said loop catching means to an inoperative position, means on said means mounting said clamping means for actuating said loop catching means to an operative position as said clamping means is moved to clamping position, and means actuated by said control means at the completion of winding operations for releasing said clamping means and said loop catching means and for engaging said winding pins to remove a wound core from said support.

2. In a electromagnetic core winding machine, a core support mounted for oscillatory movement about a vertical axis, a wire laying needle, means for reciprocating said needle vertically through a core on said support and for projecting said needle radially of a core adjacent the upper and lower limits of its movement, a lower forming member mounted below and in spaced relation to a core on said support and having a slot to receive said needle when projected, an upper forming member having a slot to receive said needle when projected, means for moving said upper forming member to and from an operative position spaced from a core on said support and within the limits of the reciprocating movement of said needle and an inoperative position away from said core support, means for oscillating said core support while said needle is above and below a core thereon, drive means for actuating said needle and said oscillating means, control means for energizing said drive means to lay wire in a core according to a predetermined plan and for de-energizing said drive means and for actuating said moving means to move said upper forming member to said inoperative position at the termination of a winding operation.

3. In an electromagnetic core winding machine, a core support mounted for oscillatory movement about a vertical axis, a wire laying needle, means for reciprocating said needle vertically through a core on said support and for projecting said needle radially of a core adjacent the upper and lower limits of its movement, a lower forming member mounted below and in spaced relation to a core on said support and having a slot to receive said needle when projected, an upper forming member having a slot to receive said needle when projected, means for moving said upper forming member to and from an operative position spaced from a core on said support and within the limits of the reciprocating movement of said needle and an inoperative position away from said core support, means for oscillating said core support while said needle is above and below a core thereon to wrap wire on said forming member to shape the end spans of coils wound on the core, a drive mechanism for driving said needle and said oscillating means in synchronism, automatic control means for stopping said needle and oscillating means at the termination of a winding operation and for actuating said moving means to move said upper forming member to an inoperative position, clamping means carried by said moving means operative to clamp a core on said support when said upper forming member is in operative position and means on said moving means for engaging winding pins on a core on said core support and for removing a wound core from said core support as said moving means moves said upper forming member to said inoperative position.

4. In an electromagnetic core winding machine, a core support, a wire laying needle mounted for reciprocating movement through a core on said support, mechanism for oscillating said support through arcs varying with the slot span of coils being wound on a core including a rocking lever, a fulcrum on which said lever is rockably mounted, means slidably mounting said fulcrum, means for oscillating said lever, means driven by said lever for oscillating said core support, a stop on said fulcrum mounting means, a plurality of limit members spaced from each other in the direction of sliding movement of said fulcrum, means mounting said limit members for successive movement into the path of said stop, means biasing said fulcrum mounting means and stop for sliding movement relative to said oscillating means to engage said stop with said limit members whereby the slot span of coils wound on a core on said support varies with the limit member engaged by said stop, means for driving said needle and said oscillating mechanism in synchronism to oscillate said support at each end of a needle stroke, means actuated by said drive means for moving said limit member mounting means each time a coil of a given slot span has been wound with a predetermined number of turns to remove each of said limit members from the path of movement of said stop and to move a successive limit member into the path of said stop taken in the direction in which said stop is biased for sliding movement, and restoring means for moving said fulcrum mounting means and stop and said limit member mounting means to engage said stop with an end limit member opposite the direction in which said stop is biased, and control means for stopping said drive means and for actuating said restoring means after a predetermined number of coil sets of differing slot span have been applied to a core on said support.

5. In a machine for winding electromagnetic cores, a core support, a wire laying needle mounted for reciprocating movement through a core on said support, mechanism for oscillating said core support while said needle is at the ends of its stroke including means for progressively varying the arc through which said support is oscillated to vary the slot span of coils wound by said needle after a predetermined number of turns have been wound in each coil, said arc varying means including a member biased to move in a predetermined direction and a plurality of stops which are progressively moved into the path of said member as the coil slot span is changed, drive means for driving said needle and said oscillating mechanism in synchronism, control means actuated by said oscillating mechanism for stopping said drive means after a predetermined number of coils is predetermined slot span have been laid in a core on said support, and means actuated by said oscillating mechanism simultaneously with said control means for restoring said member and said stops to their original relation.

6. In a machine for winding electromagnetic cores, a core support, a wire laying needle mounted to reciprocate through a core on said support, mechanism for rocking said support at each end of the stroke of said needle including a member mounted for movement between two limit positions for varying the magnitude of the arc through which said support is rocked to cause said needle to wind coils of varying slot span, means biasing said member for movement to one of said limit positions, means for arresting movement of said member by said biasing means at a plurality of positions including said limit positions to cause said needle to wind a predetermined number of coil turns during each period of arrest of said member, means for driving said needle and said oscillating mechanism in synchronism, control means actuated by said oscillating mechanism for stopping said driving means after said member has been arrested at said one limit position while a predetermined number of coil turns are laid by said needle, and means actuated by said oscillating mechanism simultaneously with said control means for moving said member to the other of said limit positions and for actuating said arresting means to hold said member at said other of said limit positions.

7. In a machine for winding electromagnetic cores having a support for a core with emplaced winding pins and wire laying mechanism including means for oscillating said support and a core mounted thereon, the combination of a hydraulic cylinder having a reciprocatory piston rod movable toward and away from said core support, a ring member carried by said rod having a projecting stop on the end thereof remote from said core support, clamping means slidably and rotatably mounted on said ring member including presser feet projecting beyond said ring member in the direction of said support whereby said presser feet engage and hold a core on said support with said clamping means engaging said stop when said rod is actuated in the direction of said support, means on said ring member for engaging said winding pins when a core on said support is in predetermined relation to said ring member, control means for stopping said wire laying mechanism when a predetermined winding operation has been completed with a core on said support in said predetermined relation and for then actuating said cylinder to retract said rod from said support to remove a core from said support, and a fixed stop engageable by said clamping means as said ring member moves away from said support for sliding said ring member on said support to push a supported core away from said ring member to effect partial withdrawal of the winding pins therefrom.

8. In a machine for winding electromagnetic cores having a core support, a wire laying needle reciprocable with respect to said core support to apply wire to a core on said support, mechanism for reciprocating said needle and for oscillating said core support in synchronism with said needle and through arcs of varying magnitude to apply coils of varying slot span to a core on said core support, the combination of winding pins having hook portions on their ends and adapted to be engaged in a core to be wound with the hook portions thereof projecting axially of such core, a clamp support, means mounting said clamp support for movement toward and away from said core support, a clamping mechanism slidably and rotatably mounted on said clamp support, spaced stops on said clamp support limiting sliding movement of said clamping mechanism, said clamping mechanism including a plurality of projecting members adapted to engage and hold a core on said core support, grip members on said clamp support having end portions freely movable through the hook portions on said winding pins when said clamping mechanism is positioned to clamp a core on said core support, control mechanism for activating said clamp support mounting means to clamp a core on said core support at the start of a winding operation and to stop said needle reciprocating and core support oscillating mechanism at the completion of a winding operation with the end portions of said grip members in the hook portions of said pins and for thereafter actuating said mounting means to move said clamping mechanism away from said core support to remove a wound core therefrom, and a fixed stop engageable with said clamping mechanism as it is moved away from said core support to slide said clamping mechanism on said clamp support to effect partial withdrawal of said pins from a wound core.

9. In a machine for winding electromagnetic cores having a core support, a wire laying needle reciprocable through a core on said support, means for oscillating said core support including adjustable means movable through a fixed path of movement for varying the magnitude of the oscillation of said core support to cause said needle to wind coils of varying slot span, means for resetting said oscillating means at the termination of a pole winding operation to condition the machine for a new pole winding operation, means movable toward and away from said core support for clamping a core thereon, means including a motor for driving said needle laying and oscillating means, control means driven by said drive means for moving said adjustable means in one direction through said path of movement to vary the arc of oscillation of said core support according to a predetermined sequence for a complete pole winding, means operable when energized for resetting said adjustable means to condition the same to traverse said path of movement in said one direction, a control for said motor actuable by said control means at the end of each pole winding for stopping said motor and conditioning said motor control for next energizing said motor for rotation in a reverse direction, means actuable by said control means when a first pole winding is completed for energizing said resetting means, manually operated means for operating said motor control means to start said motor, manually operated means for energizing said clamping means at the start of a winding operation to move toward said core support and to clamp a core thereon, means actuated by said control means at the termination of a core winding operation for energizing said clamping means to move away from said core support, and means operated by said clamping means moving away from said core support for energizing said resetting means.

10. Apparatus according to claim 9 including means actuated by said control means for decreasing the speed of said motor when the magnitude of the arc of oscillation of said core support exceeds a predetermined value.

11. Apparatus according to claim 9 in which said support is manually movable for conditioning the apparatus for applying new pole windings to a core and includes means for catching a loop of wire forming an interpole connection as said core support is manually moved and means on said clamping means for actuating said loop catching means to and from loop catching position as said clamping means is moved toward and away from said core support respectively.

12. A machine for winding electromagnetic cores comprising a core support, mechanism for applying windings to a core on said support including a reciprocating needle and means for oscillating said core support, means including a drive motor for actuating said oscillating means and for reciprocating said needle, said oscillating means including a rock bar mounted on a slidably mounted pivot for varying the magnitude of the arc through which said core support is oscillated, means biasing said pivot in one direction, a drum driven by said drive means having a plurality of axially spaced stops thereon positioned to be moved successively into and out of the path of movement of said pivot, means operative when energized for moving said pivot against said biasing means and for shifting said drum to reset said drum and pivot to an initial position relative to each other, means for clamping a core to be wound on said core support, means for moving said clamping means to and from clamping position, a speed controller for said motor, a reversing and control switch for said motor, means actuated by said drum for operating said speed controller to operate said motor at one speed when coils of small slot span are being wound and for operating said motor at a lower speed when coils of large slot span are being wound, manually operated means for actuating said control switch to starting position, means actuated by said drum for actuating said control switch to a first stop position after one pole winding has been completed, means actuated by said drum and said control switch in said first stop position for energizing said resetting means, manually actuated means for indexing a core on said support to a new position for winding a new pole winding of opposite polarity, said manually actuated control switch actuator being now positioned to energize said motor for reverse rotation, means actuated by said drum for operating said control switch to stop said motor at the completion of a second pole winding and for actuating said clamping means away from clamping position, and means by said clamping means moving away from clamping position for energizing said resetting means.

13. In an electromagnetic core winding machine, a support frame, a core support rotatably mounted on said frame, a wire laying needle mounted on said frame for reciprocating movement through a core on said support, mechanism on said frame for oscillating said core support including a lever mounted on a rocking fulcrum means slidably mounting said fulcrum on said frame, oscillating drive means connected to one end of said lever, means connected to the other end of said lever for oscillating said support, means biasing said fulcrum for sliding movement on said frame relative to said oscillating drive means to vary the angular movement imparted to said core support, a stop on said fulcrum mounting means, a control member movably mounted on the frame, a plurality of limit stops on the control member spaced progressively closer to the point of connection of said lever and said oscillating drive means in synchronism to oscillate said drive means through a predetermined arc when said needle is at an end of its stroke, means for moving said control member transversely to the direction of movement of said fulcrum mounting means to move said limit stops progressively into the path of said fulcrum stop whereby said fulcrum is progressively moved by said biasing means toward said oscillating means to the limit allowed by said limit stops for progressively varying the slot span of coils wound by said needle, control mechanism including means for stopping said needle and said oscillating means when said needle has wound the coils of a complete pole on a core, and means operable to reset said control member and fulcrum mounting means with the fulcrum stop engaging the limit stop of maximum distance from said oscillating drive means after each traverse of said limit stops by said fulcrum stop.

References Cited in the file of this patent

UNITED STATES PATENTS

| | | |
|---|---|---|
| 1,977,828 | Laib et al. | Oct. 23, 1934 |
| 2,304,520 | Wirtz et al. | Dec. 8, 1942 |
| 2,573,976 | Linders | Nov. 6, 1951 |
| 2,594,707 | Allen | Apr. 29, 1952 |
| 2,627,379 | Moore | Feb. 3, 1953 |
| 2,640,652 | Harvey | June 2, 1953 |

FOREIGN PATENTS

| | | |
|---|---|---|
| 685,121 | Great Britain | Dec. 31, 1952 |